United States Patent Office 2,766,285
Patented Oct. 9, 1956

2,766,285

SUBSTITUTED AMINOPROPYNES AND PROCESS FOR THEIR PREPARATION

George F. Hennion, South Bend, Ind., assignor to Eli Lilly and Company, Indianapolis, Ind., a corporation of Indiana No Drawing. Application October 20, 1952, Serial No. 315,833

3 Claims. (Cl. 260—563)

This invention relates to substituted 3-amino-1-propynes and the process for their preparation.

The new compounds of my invention may be represented by the formula:

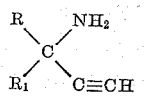

wherein R and $R_1$ represent hydrogen and alkyl radicals, and wherein R and $R_1$ taken together with the carbon atom to which they are attached may constitute a carbocyclic ring system, and acid addition salts thereof.

The new compounds have broncho-dilating action when administered parenterally and are of utility as intermediates in the synthesis of physiologically active substances. Thus for example the corresponding ureido derivatives formed by condensing the aminopropynes with sodium isocyanate are hypnotics.

My invention also encompasses a novel process for the synthesis of new substituted aminopropynes, as represented by the following series of equations, wherein R and $R_1$ have the same significance as hereinabove, and X represents chlorine or bromine; and wherein $\ominus B$ represents the anion of a basic halopropyne-ionizing agent.

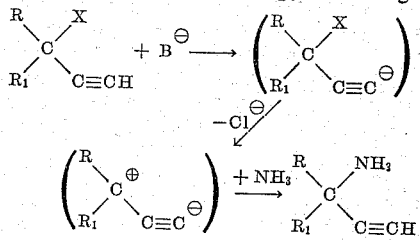

It will be seen that the anion of the base brings about dissociation of the halopropyne by removing a proton from the acetylenic group. The resulting compound spontaneously loses the halide ion to form a dipolar ion, which reacts with ammonia to form the desired aminopropyne. Thus, the new process comprises the reaction of ammonia with a substituted 3-halo-1-propyne in the presence of a basic agent capable of initiating ionization of the haloalkyne.

Starting materials for the preparation of the new substituted aminopropynes are provided from known substances, for example, according to the following known scheme of reaction: An appropriately substituted carbonyl-group-containing compound having the desired R and $R_1$ groups as indicated above, is treated with sodium acetylide in the presence of ammonia to form the corresponding substituted propynol. The R—$R_1$ substituted propynol is converted by means of a halogenating agent such as hydrobromic acid, hydrochloric acid, thionyl chloride, thionyl bromide and the like to the substituted halopropyne which is the starting material for my novel process. The following equations, in which R, $R_1$ and X have the same significance as hereinabove, illustrate the course of the reaction leading to the preparation of intermediate compounds.

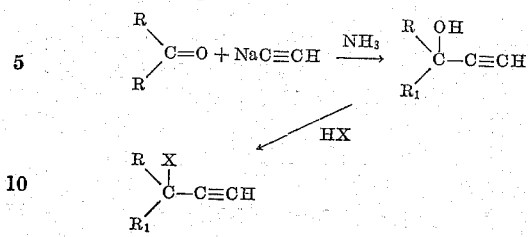

The new process for the preparation of the novel aminopropynes of this invention is conveniently carried out in liquid ammonia solution, but where the substituted halopropyne is insoluble in liquid ammonia, inert solvents such as ether, xylene, toluene or mineral oil and the like can be employed to bring the reactants into solution.

Suitable basic agents for initiating dissociation of substituted halopropynes are exemplified by the metallic amides, such as sodamide and potassamide, and metallic acetylides, for example, sodium acetylide and potassium acetylide, and the like.

The process is preferably conducted at low temperatures, in the range of about $-70°$ to about $-30°$ C. but higher temperatures ranging up to about $+30°$ C. can be used. The reactants are preferably brought together at atmospheric pressure, whereby the evaporation of the liquid ammonia serves to keep the temperature of the reaction mixture in the lower ranges; but higher pressures can be used, particularly where the reactants are to be warmed above the boiling point of the reaction mixture.

The new substituted 3-aminopropynes of this invention are oils or low-melting solids which are stable and can readily be distilled for purification. They are characterized by the presence of the acetylenic bond. The compounds also contain a primary amino group, which readily forms acid addition salts. The acid addition salts of the new aminopropynes can be formed by simple addition reactions as, for example, the reaction of stoichiometrically equivalent amounts of the aminopropyne and a selected acid, in a mutual solvent, followed by removal of the solvent. Examples of acids which can be employed for the purpose of preparing acid addition salts of 3-aminopropynes are mineral acids, such as hydrochloric, sulfuric, nitric and phosphoric acids, and the like, and organic acids, such as acetic, valeric, salicylic, benzoic, phthalic and citric acids, and their equivalents.

The following examples will more specifically illustrate the new substituted aminopropynes and the process for their preparation.

EXAMPLE 1

Preparation of 3-amino-3-methyl-1-butyne

A solution of 51 g. (0.5 mole) of 3-chloro-3-methyl-1-butyne boiling at 75–76° C. and prepared by the process of Hennion et al., J. Am. Chem. Soc. 72, 3542 (1950), in about 135 cc. of anhydrous ether, was added dropwise to a mixture of sodamide and liquid ammonia prepared from 13 g. of sodium metal in 500 cc. of liquid ammonia, according to the process of Vaughn et al., J. Am. Chem. Soc., 56, 2120 (1934). The reaction mixture was stirred throughout the addition. When the addition of the chloropropyne was complete stirring was discontinued and the reaction mixture was allowed to stand overnight, whereupon most of the ammonia evaporated. The residue was covered with about 50 cc. of ether and 100 g. of chopped ice were added with stirring to decompose any remaining sodamide. When the ice had melted, the ethereal layer which formed was removed and the aqueous layer was filtered and extracted twice with 100 cc. portions of ether. All of the ether extracts were combined and dried over anhydrous potassium carbonate. The dried ether solution, containing the 3-amino-3-methyl-1-butyne formed in the reaction, was fractionally distilled at atmospheric pressure. After removal of the ether, continued distillation yielded 20 gms. of 3-amino-3-methyl-1-butyne boiling at 77–82° C., a yield of 50 percent of theoretical. On redistillation, the 3-amino-3-methyl-1-butyne boiled at 81–82° C. and melted at about 18° C.; and had $n_D^{25}=1.4210$.

EXAMPLE 2

Preparation of 3-amino-1-hexyne

To a solution of sodamide in liquid ammonia prepared from 16 gms. of metallic sodium in 500 cc. of liquid ammonia were added 78 gms. of 3-chloro-1-hexyne (prepared according to the method of Hennion and Sheehan, J. Am. Soc., 71, 1964 (1949)), with mechanical stirring over a period of approximately one hour. The reaction mixture was cooled externally by means of a bath of isopropanol and solid carbon dioxide. Stirring was continued for an additional thirty minutes, and the reaction mixture was allowed to warm to room temperature by standing overnight, whereupon the ammonia evaporated. 150 cc. of ether were added to the residue, followed by about 75 gms. of chopped ice. The ethereal layer, containing the 3-amino-1-hexyne formed in the reaction, was separated and the aqueous layer was extracted twice with small portions of ether. The ethereal solutions were combined, dried over anhydrous potassium carbonate and the ether removed by distillation. The residue was fractionally distilled under reduced pressure.

3-amino-1-hexyne thus prepared boiled at 71°–72° C. at the pressure of 100 mm. of mercury. A yield of 44 g., 68 percent of theoretical, was obtained.

EXAMPLE 3

Preparation of 3-amino-3-methyl-1-pentyne

To a mixture of 98 gms. of 3-methyl-1-pentyne-3-ol, 55.5 gms. of solid calcium chloride and one gm. of copper-bronze powder were added 430 cc. of cold concentrated hydrochloric acid and the mixture was shaken occasionally for about one hour. A two-phase system formed, and the dark oily upper layer was removed and washed with 86 cc. of concentrated hydrochloric acid. The oil was dried with 20 gms. of anhydrous potassium carbonate, and weighed 92 gms. The crude oil, containing 3-chloro-3-methyl-1-pentyne formed in the reaction, was diluted with anhydrous ether to a total volume of 250 cc., and the solution was added dropwise over a period of about one hour to a solution of sodamide in liquid ammonia prepared from 20 gms. of sodium and 600 cc. of liquid ammonia. The reaction mixture was allowed to stand overnight, whereupon the ammonia evaporated, and 150 cc. of ether were added, followed by about 80 gms. of chopped ice. The ethereal layer was removed and the remaining aqueous layer was extracted twice with 50 cc. portions of ether. The ethereal solutions were combined, dried over anhydrous potassium carbonate, and the ether was removed by distillation. The residue, containing 3-amino-3-methyl-1-pentyne formed in the reaction, was fractionally distilled. The fraction boiling from 96°–109° C. was recovered and was found to have index of refraction at 25° C. ranging from 1.4318 to 1.4350 and weighed 36 gms. The distillate recovered was dried over potassium hydroxide pellets and redistilled. 3-amino-3-methyl-1-pentyne thus prepared boiled at 105–109° C. at atmospheric pressure. A yield of 21.6 gms. of material having index of refraction at 25° C. ranging from 1.4330–1.4338 was recovered.

EXAMPLE 4

Preparation of 3-amino-3-ethyl-1-pentyne 3-ethyl-1-pentyne-3-ol was treated with hydrochloric acid according to the procedure set forth in Example 3 to produce 3-chloro-3-ethyl-1-pentyne.

3-chloro-3-ethyl-1-pentyne thus prepared boiled at 71–72° C. at the pressure of 100 mm. of mercury.

163.5 g. of 3-chloro-3-ethyl-1-pentyne were dissolved in two volumes of anhydrous ether and the solution was added to a solution of 49 g. of sodamide in liquid ammonia over a period of about one hour. The reaction mixture was treated according to the procedure of Example 3 to isolate the 3-amino-3-ethyl-1-pentyne formed in the reaction.

3-amino-3-ethyl-1-pentyne thus prepared boiled at about 73–74° C. at the pressure of about 100 mm. of mercury, and the index of refraction at 25° C. was 1.4392. A yield of 60 percent of theoretical was obtained.

EXAMPLE 5

Preparation of 3-amino-3-methyl-1-hexyne 3-chloro-3-methyl-1-hexyne was prepared from 3-methyl-1-hexyne-3-ol according to the procedure of Example 3.

3-chloro-3-methyl-1-hexyne thus prepared boiled at about 69–70° C. at the pressure of about 100 mm. of mercury.

The 3-chloro-3-methyl-1-hexyne which was thus prepared was treated with sodamide in liquid ammonia according to the procedure of Example 3, to form 3-amino-3-methyl-1-hexyne.

3-amino-3-methyl-1-hexyne thus prepared boiled at about 69–70° C. at the pressure of 100 mm. of mercury, and the index of refraction at 25° C. was 1.4346. A yield of 49 percent of theoretical was obtained.

EXAMPLE 6

Preparation of 3-amino-3-methyl-1-octyne 132 g. of 3-methyl-1-octyne-3-ol were saturated with dry hydrogen chloride gas at room temperature. About 35 g. of hydrogen chloride were absorbed, and the reaction mixture was fractionally distilled under reduced pressure. 3 - chloro - 3 - methyl - 1 - octyne thus prepared boiled at about 62–65° C. at the pressure of 25 mm. of mercury and the index of refraction at 25° C. ranged from about 1.4400 to 1.4410.

10.5 g. of sodium were converted to sodamide in 500 cc. of liquid ammonia over a period of about one hour, and to the solution thus prepared was added a solution of 67 g. of 3-chloro-3-methyl-1-octyne in 400 cc. of anhydrous ether, over a period of about one hour and with continuous stirring. The reaction mixture was stirred for about one hour after the addition of the carbinyl chloride had been completed. About 100 cc. of anhydrous ether were added, stirring was discontinued and the mixture was allowed to stand overnight whereupon the ammonia evaporated. About 200 cc. of ether were added to the residue, followed by about 250 g. of chopped ice. The ether layer was removed and the remaining aqueous layer was extracted with 75 cc. of ether. The combined ether solutions were washed with cold water and dried over anhydrous potassium carbonate. The ether was removed by evaporation and the residue was fractionally distilled in vacuo. 40.8 g. of 3 - amino - 3 - methyl - 1 - octyne boiling at about 70–74° C. at 25 mm. of mercury, and having index of refraction at 25° C. ranging from 1.4385 to 1.4412, were recovered. The yield was about 70 percent of theoretical. On further purification by the usual acid-base extraction procedure followed by distillation, 3-amino-3-methyl-1-octyne boiled at 76–77° C. at the pressure of 25 mm. of mercury and had index of refraction at 25°

C. of 1.4391. A yield of 48 percent of theoretical was obtained.

EXAMPLE 7

*Preparation of 3-amino-1-nonyne*

1-nonyne-3-ol was treated with thionyl chloride according to the process of Hennion et al., J. Am. Chem. Soc. 71, 1964 (1949) to obtain 3-chloro-1-nonyne, boiling at about 70° C. at the pressure of 10 mm. of mercury, and having index of refraction at 25° C. of 1.4470. The 3-chloro-1-nonyne thus prepared was dissolved in ether and the solution was added to a sodamide in liquid ammonia according to the procedure of Example 6.

3-amino-1-nonyne thus prepared boiled at about 74° C. at the pressure of 10 mm. of mercury, and had index of refraction at 25° C. of 1.4452. A yield of 76 percent of theoretical was obtained.

EXAMPLE 8

*Preparation of 1-amino-1-ethynylcyclohexane*

1-ethynylcyclohexanol was treated with concentrated hydrochloric acid according to the procedure of Example 3 to prepare 1-chloro-1-ethynylcyclohexane which boiled at about 66° C. at the pressure of 20 mm. of mercury, and had index of refraction at 25° C. ranging from 1.4770 to 1.4780.

The 1-chloro-1-ethynylcyclohexane thus prepared was dissolved in ether and added to a solution of sodamide in liquid ammonia according to the procedure of Example 6. The 1-amino-1-ethynylcyclohexane thus prepared boiled at about 65–66° C. at the pressure of 20 mm. of mercury and had index of refraction at 25° C. of 1.4796. A yield of 72 percent of theoretical was obtained.

EXAMPLE 9

A solution of sodium acetylide in liquid ammonia was prepared by adding 16.5 g. of metallic sodium to liquid ammonia while introducing acetylene gas, according to the procedure of Hennion, Proceedings of the Indiana Academy of Science, 47, 116–121 (1938). To the solution thus prepared was added dropwise, with stirring, a solution of 79 g. of 3-chloro-3-methyl-1-pentyne in 200 cc. of anhydrous ether. After the addition of the ether solution was completed, stirring was continued for about one hour and the mixture was then allowed to stand for about five hours whereupon most of the liquid ammonia evaporated. 100 cc. of ether and 100 g. of chopped ice were added and the reaction mixture was stirred for about one-half hour. The ethereal layer was removed, dried over anhydrous potassium carbonate and the ether was evaporated at atmospheric pressure. The residue, containing the 3 - amino - 3 - methyl - 1 - pentyne formed in the reaction, was fractionally distilled at reduced pressure. A total of 39 g. of 3-amino-3-methyl-1-pentyne was recovered, or a yield of about 59 percent of theoretical. The product was dissolved in cold hydrochloric acid and extracted with ether to remove impurities. The addition of an excess of cold sodium hydroxide solution to the acidic aqueous solution caused the separation of 35 g. of pure 3 - amino - 3 - methyl-1-pentyne which upon redistillation boiled at about 54–56° C. at the pressure of 120 mm. of mercury.

EXAMPLE 10

*Preparation of 3-amino-3-methyl-1-pentyne*

To 98 g. (1 mol) of freshly distilled 3 - methyl - 1-pentyne-3-ol boiling at about 120° C. and cooled to about 5° C. were added about 665 g. of cold 48 percent aqueous hydrobromic acid. The mixture was well shaken and allowed to warm to room temperature. Within ten minutes an upper oily layer appeared, and the mixture was allowed to stand for about two hours during which the oily layer increased in amount. The oil, comprising 3-bromo-3-methyl-1-pentyne formed in the reaction, was separated from the lower aqueous layer and dried overnight using anhydrous potassium carbonate. When removed from the potassium carbonate, the dried oil weighed approximately 148 g. The 3-bromo-3-methyl-1-pentyne thus prepared was diluted with two volumes of anhydrous ether and employed without further purification for the preparation of 3-amino-3-methyl-1-pentyne as follows:

A solution of sodamide in liquid ammonia was formed by the addition of 23 g. of metallic sodium to 500 cc. of liquid ammonia, and the ethereal solution of 3-bromo-3-methyl-1-pentyne was added thereto dropwise and with stirring over a period of about forty-five minutes. An additional 200 cc. portion of liquid ammonia was added to the reaction mixture, the stirring was discontinued and the reaction mixture was allowed to stand overnight at room temperature whereupon most of the ammonia evaporated. The mixture was then treated with 200 cc. of ether and 200 g. of chopped ice, with stirring. The ethereal layer was removed and the remaining aqueous solution was extracted twice with 50 cc. portions of ether. The ethereal solutions were combined, dried over anhydrous potassium carbonate, and the ether was removed by distillation at atmospheric pressure. The residue, containing the 3-amino-3-methyl-1-pentyne formed in the reaction, was fractionally distilled under reduced pressure. 3-amino-3-methyl-1-pentyne thus prepared boiled at about 53–58° C. at the pressure of 120 mm. of mercury and a total of 23 g. was recovered. The distilled product had index of refraction at 25° C. of 1.4326.

EXAMPLE 11

To a solution of 8.3 g. (0.1 mol.) of 3-amino-3-methyl-1-butyne in 50 cc. of acetone were added with stirring and cooling 7 cc. (0.05 mol.) of 14 N sulfuric acid. An immediate precipitate of 3-amino-3-methyl-1-butyne sulfate formed, and was filtered off, washed with cold acetone and dried.

3-amino-3-methyl-1-butyne sulfate thus prepared was a water-soluble white solid.

*Analysis.*—Calculated for $C_5H_9N.1/2H_2SO_4$: N, 10.57. Found: N, 10.29.

By following the described procedure, but using hydrochloric, nitric, and phosphoric acids, the hydrochloric, nitric, phosphoric and acid addition salts, respectively, of 3-amino-3-methyl-1-butyne are formed.

I claim:

1. The process for the preparation of 3-amino-1-propynes which comprises bringing together anhydrous liquid ammonia and a compound represented by the formula

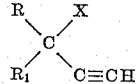

wherein X is a halogen of the group consisting of chlorine and bromine and R and $R_1$ are members of the group consisting of hydrogen and lower alkyl radicals, at least one of R and $R_1$ having a hydrogen atom on a carbon atom alpha to the carbon atom carrying the halogen, and cyclohexyl radicals when taken together with the carbon atom to which they are attached; at a temperature in the range from about −70° C. to about +30° C., and in the presence of a basic agent of the group consisting of alkali metal amides and alkali metal acetylides.

2. The process for the preparation of 3-amino-1-propynes which comprises bringing together anhydrous liquid ammonia and a compound represented by the formula

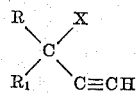

wherein X is a halogen of the group consisting of chlorine and bromine and R and $R_1$ are members of the group consisting of hydrogen and lower alkyl radicals, at least one of R and R₁ having a hydrogen atom on a carbon atom alpha to the carbon atom carrying the halogen, and cyclohexyl radicals when taken together with the carbon atom to which they are attached; at a temperature in the range from about −70° C. to about +30° C., and in the presence of sodium acetylide.

3. The process for the preparation of 3-amino-1-propynes which comprises bringing together anhydrous liquid ammonia and a compound represented by the formula

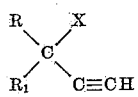

wherein X is a halogen of the group consisting of chlorine and bromine and R and R₁ are members of the group consisting of hydrogen and lower alkyl radicals, at least one of R and R₁ having a hydrogen atom on a carbon atom alpha to the carbon atom carrying the halogen, and cyclohexyl radicals when taken together with the carbon atom to which they are attached; at a temperature in the range from about −70° C. to about +30° C., and in the presence of sodamide.

References Cited in the file of this patent

UNITED STATES PATENTS

| | | |
|---|---|---|
| 2,268,129 | Reppe et al. | Dec. 30, 1941 |
| 2,273,141 | Reppe et al. | Feb. 17, 1942 |

FOREIGN PATENTS

| | | |
|---|---|---|
| 510,904 | Great Britain | Aug. 10, 1939 |
| 595,540 | Great Britain | Dec. 8, 1947 |
| 619,206 | Great Britain | Mar. 4, 1949 |

OTHER REFERENCES

Ser. No. 440,980 (A. P. C.), published Apr. 20, 1943.
Peal et al.: "Berichte" (1889), vol. 22, pp. 3076–9.
Wolf: "Ann." (1952), vol. 576, pp. 35–45.
Chauvelier et al.: "Comptes Rendus" (January–June 1951), vol. 232, pp. 167–9 (rec'd Feb. 8, 1951).